(12) United States Patent
Nelin et al.

(10) Patent No.: US 6,253,368 B1
(45) Date of Patent: Jun. 26, 2001

(54) DYNAMICALLY DEBUGGING USER-DEFINED FUNCTIONS AND STORED PROCEDURES

(75) Inventors: Constance J. Nelin, Monte Sereno; Gerald Herman Roth, San Jose; Frederick Thomas Sharp, Menlo Park; Shu-Huar Joseph Yeh, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/928,621

(22) Filed: Sep. 12, 1997

Related U.S. Application Data

(63) Continuation-in-part of application No. 08/828,481, filed on Mar. 31, 1997, now Pat. No. 6,061,517, and a continuation-in-part of application No. 08/828,854, filed on Mar. 31, 1997, now Pat. No. 6,145,119, and a continuation-in-part of application No. 08/828,476, filed on Mar. 31, 1997, now Pat. No. 5,890,158, and a continuation-in-part of application No. 08/828,480, filed on Mar. 31, 1997, now Pat. No. 6,188,400, and a continuation-in-part of application No. 08/828,989, filed on Mar. 31, 1997, now Pat. No. 5,940,593, and a continuation-in-part of application No. 08/828,478, filed on Mar. 31, 1997, now Pat. No. 5,953,525, and a continuation-in-part of application No. 08/829,104, filed on Mar. 31, 1997, now Pat. No. 6,069,627, and a continuation-in-part of application No. 08/828,846, filed on Mar. 31, 1997, now Pat. No. 5,956,036, and a continuation-in-part of application No. 08/828,479, filed on Mar. 31, 1997, now Pat. No. 5,911,075, and a continuation-in-part of application No. 08/828,477, filed on Mar. 31, 1997, now Pat. No. 5,883,626, and a continuation-in-part of application No. 08/828,890, filed on Mar. 31, 1997, now Pat. No. 5,953,731, and a continuation-in-part of application No. 08/828,897, filed on Mar. 31, 1997, now Pat. No. 6,058,264, and a continuation-in-part of application No. 08/828,990, filed on Mar. 31, 1997, now Pat. No. 5,875,322.

(51) Int. Cl.$^7$ .................................................. G06F 9/45
(52) U.S. Cl. ........................................................ 717/4
(58) Field of Search .......................... 717/1, 2, 4; 714/34, 714/38; 707/100, 101, 102; 345/967

(56) References Cited

U.S. PATENT DOCUMENTS

| | | | |
|---|---|---|---|
| 4,910,663 | * 3/1990 | Bailey | 714/34 |
| 5,655,073 | * 8/1997 | Nishikado et al. | 714/38 |
| 5,675,800 | * 10/1997 | Fisher, Jr. et al. | 713/2 |
| 5,771,385 | * 6/1998 | Harper | 395/704 |
| 5,926,637 | * 7/1999 | Inoue | 395/704 |
| 5,978,902 | * 11/1999 | Mann | 712/227 |

* cited by examiner

Primary Examiner—Kakali Chaki
(74) Attorney, Agent, or Firm—Gates & Cooper LLP

(57) ABSTRACT

A method, apparatus, and article of manufacture and memory for providing a programming development environment that supports the development of Internet and Intranet applications. More specially, the present invention discloses an efficient, versatile dynamic debugger that allows platform-independent debugging of applications written in a wide variety of languages.

33 Claims, 13 Drawing Sheets

DYNAMICALLY DEBUGGING USER-DEFINED FUNCTIONS AND STORED PROCEDURES

RELATED APPLICATIONS

This application is a continuation-in-part of the following co-pending and commonly-assigned applications:

Application Ser. No. 08/828,481, entitled "MULTI-TIER DEBUGGING," filed Mar. 31, 1997, by Daniel E. House and Constance J. Nelin, now U.S. Pat. No. 6,061,517;

Application Ser. No. 08/828,854, entitled "PROGRAMMING DEVELOPMENT ENVIRONMENT FOR INTRANET AND INTERNET APPLICATIONS EMPLOYING UNIQUE PROJECT DATA STRUCTURE," filed Mar. 31, 1997, by Daniel E. House, Brian J. Owings, and Shiau-Shiau Pei, now U.S. Pat. No. 6,145,119;

Application Ser. No. 08/828,476, entitled "SHARED OBJECT MODEL," filed Mar. 31, 1997, by Daniel E. House, Brian J. Owings, and Shiau-Shiau Pei, now U.S. Pat. No. 5,890,158;

Application Ser. No. 08/828,480, entitled "REMOTE SCRIPTING OF LOCAL OBJECTS," filed Mar. 31, 1997, by Daniel E. House, Constance J. Nelin, and Rebecca B. Nin, now U.S. Pat. No. 6,188,400;

Application Ser. No. 08/828,989, entitled "METHOD AND APPARATUS FOR SIMULATING A MULTI-TIERED COMPUTER ENVIRONMENT," filed Mar. 31, 1997, by Daniel E. House and Constance J. Nelin, now U.S. Pat. No. 5,940,593;

Application Ser. No. 08/828,478, entitled "MULTI-TIER VIEW PROJECT WINDOW," filed Mar. 31, 1997, by Howard J. Glaser, Daniel E. House, and Constance J. Nelin, now U.S. Pat. No. 5,953,525;

Application Ser. No. 08/829,104, entitled "EXTENDER USER INTERFACE," filed Mar. 31, 1997, by Thomas E. Conrad, Howard J. Glaser, Jean C. Ho, James L. Keesey, Constance J. Nelin, and Gerald J. Wilmot, now U.S. Pat. No. 6,069,627;

Application Ser. No. 08/828,846, entitled "SHARED MODULES GRAPHICAL USER INTERFACE," filed Mar. 31, 1997, by Howard J. Glaser, Daniel E. House, and Constance J. Nelin, now U.S. Pat. No. 5,956,036;

Application Ser. No. 08/828,479, entitled "QUERY SELECTION FOR A PROGRAM DEVELOPMENT ENVIRONMENT," filed Mar. 31, 1997, by Howard J. Glaser and Mary C. Lehner, now U.S. Pat. No. 5,911,075;

Application Ser. No. 08/828,477, entitled "DOCKING AND FLOATING MENU/TOOL BAR," filed Mar. 31, 1997, by Howard J. Glaser, Karl D. Johnson, and Stewart E. Nickolas, now U.S. Pat. No. 5,883,626;

Application Ser. No. 08/828,890, entitled "HTML INTEGRATION UTILITY FOR A PROGRAM DEVELOPMENT ENVIRONMENT," filed Mar. 31, 1997, by Howard J. Glaser, now U.S. Pat. No. 5,953,731;

Application Ser. No. 08/828,897, entitled "EXTENDER SMART GUIDE," filed Mar. 31, 1997, by Howard J. Glaser, now U.S. Pat. No. 6,058,264; and Application Ser. No. 08/828,990, entitled "DYNAMIC DISCOVERY OF CONTROLS," filed Mar. 31, 1997, by Daniel E. House and Constance J. Nelin, now U.S. Pat. No. 5,875,322;

all of which applications are incorporated by reference herein.

This application is also related to the following co-pending and commonly assigned patent application:

Application Ser. No. 08/928,620 entitled "STORING P-CODE IN A DATABASE," filed on same date herewith, by Curt L. Cotner, Wendy L. Koontz, Gerald H. Roth, Frederick T. Sharp and Shu-Huar J. Yeh, which application is hereby incorporated by reference herein.

BACKGROUND OF THE INVENTION

1. Field of the Invention

This invention relates in general to programming development environments performed by computers, and in particular, to the use of a dynamic debugging tool usable in a programming development environment for Internet and Intranet applications.

2. Description of Related Art

With the fast growing popularity of the Internet and Intranets, especially Web-based networks, there is also a fast growing demand for Internet and Intranet access to databases. However, it is especially difficult to use relational database management system (RDBMS) software with Web-based networks. One of the problems with using RDBMS software with Web-based networks is the lack of programming development environments that can be used to develop both Web-based and RDBMS-based applications.

For example, Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

In contrast, most RDBMS software uses a Structured Query Language (SQL) interface. The SQL interface has evolved into a standard language for RDBMS software and has been adopted as such by both the American Nationals Standard Organization (ANSI) and the International Standards Organization (ISO). Thus, there is a need in the art for methods of accessing RDBMS software across an Internet or Intranet, and especially via Web-based networks. Further, there is a need for simplified development environments for such systems.

There is also a need for a development environment with a rapid and flexible debugging capability, particularly with respect to the user-defined functions or stored procedures supported by RDBMS utilities. One way of implementing a debugging capability is to append the source code for the user-defined functions or stored procedures with debugging-related instructions which allow the software developer to determine the value of system or process variables and insert new variables if desired. Unfortunately, this involves compiling the debugging instructions along with the functional source code, resulting in object or machine code with both debugger and functional instructions inseparably integrated together.

This results in many disadvantages. For example, in the multi-tiered environment, this requires the user to undertake the time consuming process of recreating or rebuilding the database stored procedures or user-defined functions, even if all that is required is to execute the debug instructions or to avoid execution of the debugging instructions. Recreation or rebuilding the database stored procedures or user-defined functions may be required even if a single field or instruction in the executable is changed.

Further, the need to debug is transitory, but the lifetime of a properly operating stored procedure or user-defined function is not. Once the user-defined function or stored procedure is debugged, the software developer must rebuild these procedures or leave them in the code, increasing storage requirements and processing time. Also, although stored procedures and user-defined functions may be built on many databases at the same time, it is practical to debug only one of them. Switching from one database (for debugging purposes) to many others (for production and delivery) requires changing build targets or keeping two copies of build options. Accordingly, there is a need for a software development environment tool that supports a debugging capability without the need to rebuild or recompile stored procedures or user-defined functions. The tool must operate such that after software development, the stored procedure or user-defined function must operate properly when called by a program developed a wide variety of languages, including those other than that used by the software development environment. Similarly, the language of the software development environment must be able to call a stored procedure or user-defined function in another language, while still supporting debug functions. Because many platforms may be used to implement the software development tool, and the resulting software product must operate with a wide variety of operating systems, the debugging capability must operate with a multi-platform database system, and require no operating system specific technologies. The present invention satisfies that need.

SUMMARY OF THE INVENTION

To overcome the limitations in the prior art described above, and to overcome other limitations that will become apparent upon reading and understanding the present specification, the present invention discloses a method, apparatus, and article of manufacture for debugging a computer program or routine. The method comprises the steps of accepting an instruction set defining the computer program in the computer and storing data sufficient to invoke a debugger in a database table accessible by the computer. In one embodiment, the task of storing data invoking the debugger is performed by storing the instruction set in a database table accessible by the computer, and storing in a related database a debug flag which indicates if the debugger is to be invoked. In one embodiment, the instruction set comprises computer program instructions and a debug flag. In another embodiment, the location of the debug flag and/or the instruction set is stored in a data link library (DLL) associated with the computer program.

Although other solutions to the foregoing design requirements are possible, none provide the functionality and flexibility of the present invention. For example, debugging may be accomplished by setting an environmental variable on the server indicating that debugging operations are to be performed. While this solution is operable, it is not operating system independent, and it would be difficult to support these environment variables with many user-defined functions or stored procedures operating on the same computer, potentially implemented using different languages. Similar problems would be encountered if a debug flag were simply written in binary in the executable and written over when the debug functions were no longer desired. A hidden argument could be added to the user-defined function or the stored procedure, but this solution would not permit a user-defined function or stored procedure developed using one language to operate when called by a program developed in another language or environment, nor would the VAB program be able to call a stored procedure or user-defined function written in another language or implemented in another development environment.

The present invention provides a dynamic debugging capability which provides all of the advantages of debugging without the need to rebuild user-defined functions or stored procedures. The present invention lets the software developer set the debug flag for a stored procedure or a user-defined function for a single database (such as the IBM's DB2 database) without rebuilding by storing the debug flag in special tables in the database selected for debugging. In an alternative embodiment, the present invention also provides this functionality by appending tables with additional columns or rows. This design is compatible with a multi-server, multi-database environment, allows development and debugging and end-product interoperability with a wide variety of computer software languages, and is operating system independent.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a multi-tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. The applications constructed using the RAD tool are primarily oriented towards data access, data manipulation and data rendering, especially in conjunction with relational database management systems (RDBMS).

Hardware Environment

Figure 1:
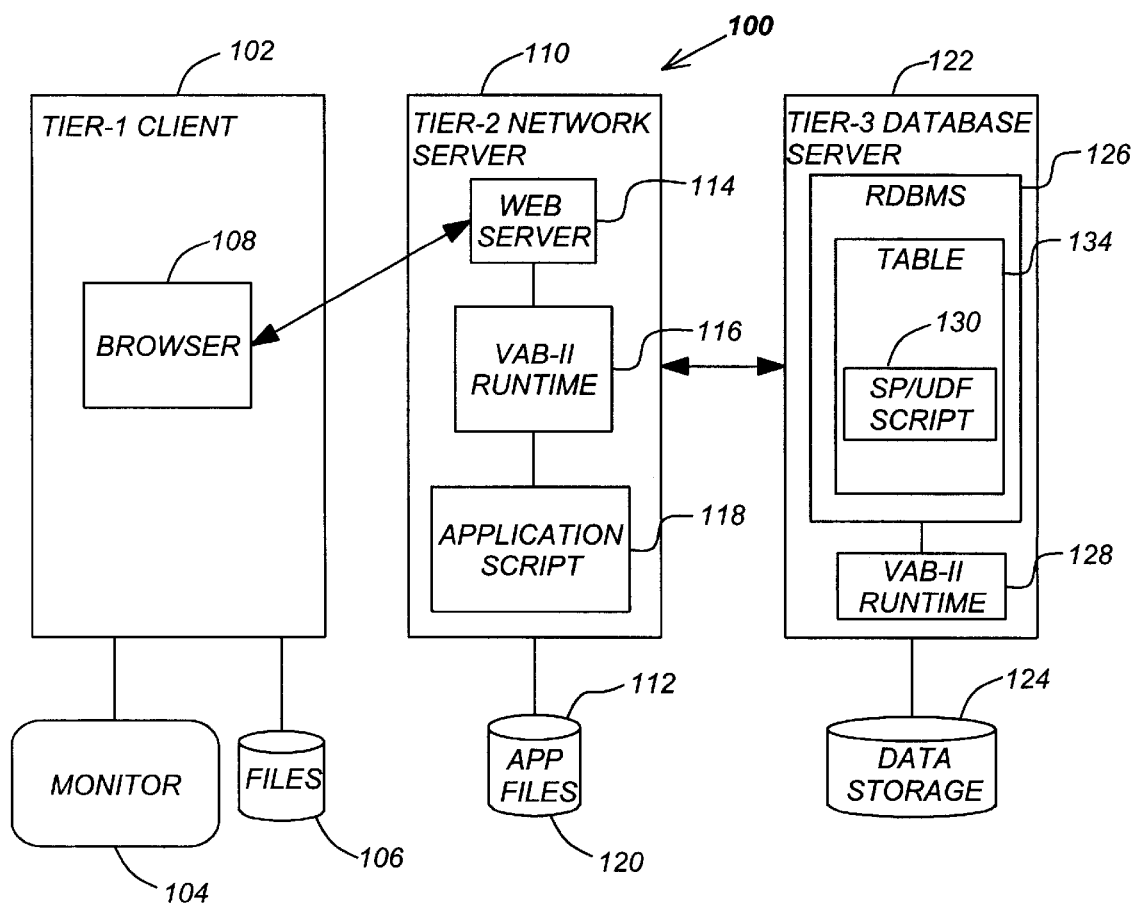
FIG. 1 is a block diagram that illustrates the three tier architecture of the present invention.

FIG. 1 is a block diagram that illustrates the three tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and one or more data storage devices 106. In one embodiment, the client computer 102 executes a browser 108 capable of containing and executing applets, such as Microsoft Internet Explorer or Netscape Navigator. The browser 108 communicates with programs on other tiers through HTTP (Hypertext Transfer Protocol).

The second tier comprises a network server 110 having one or more data storage devices 112. In one embodiment, the network server 110 executes a plurality of computer programs including a web server 114, a persistent VAB-II runtime module 116, and one or more application scripts 118 retrieved from an APP file 120 stored on a data storage device 112. The web server 114 (such as IBM, Microsoft, or Netscape HTTP daemons) communicates with the browser 108 via HTTP and the third tier via client-server connections such as may be supplied by a related database management system. The VAB-II runtime module 116 executes the application scripts 118 and communicates with the third tier. The application scripts 118 (such as LotusScript scripts) can contain programming logic for communicating with both the browser 108 and the third tier. Preferably, the application scripts 118 include Basic programming instructions, Java, ActiveX, or DLL applet controls, embedded SQL, and other mechanisms known in the art.

The third tier comprises a database server 122 having one or more data storage devices 124 connected thereto. In one embodiment, the database server executes a plurality of computer programs including a relational database management system (RDBMS) 126, a persistent VAB-II runtime module 128, and Stored Procedure (SP) and User-defined Function (UDF) scripts 130 retrieved from a table 134 maintained in the RDBMS 126. The SP/UDFs can be stored in the form of pseudo code (p-code) or source files. P-code is typically optimized intermediate code for an interpreter that runs faster and more safely than interpreting and running the source code. Also, running p-code for a server routine allows encapsulation of database authorization for embedded static SQL statements. Embedded static SQL statements in a program are prepared during the program preparation process before the program is executed. The RDBMS 126 (such as IBM's DB2 product) receives requests either directly from tier-2 and/or indirectly from tier-2 via the VAB-II runtime module 128, and then performs the desired database functions. The VAB-II runtime module 128 executes the SP/UDF script 130, which may consist of p-code or source code, or any interpretable code. The SP/UDF script 130 comprises programming logic for accessing the database via the RDBMS 126 and communicating with the tier-2 computer programs.

Figure 2:
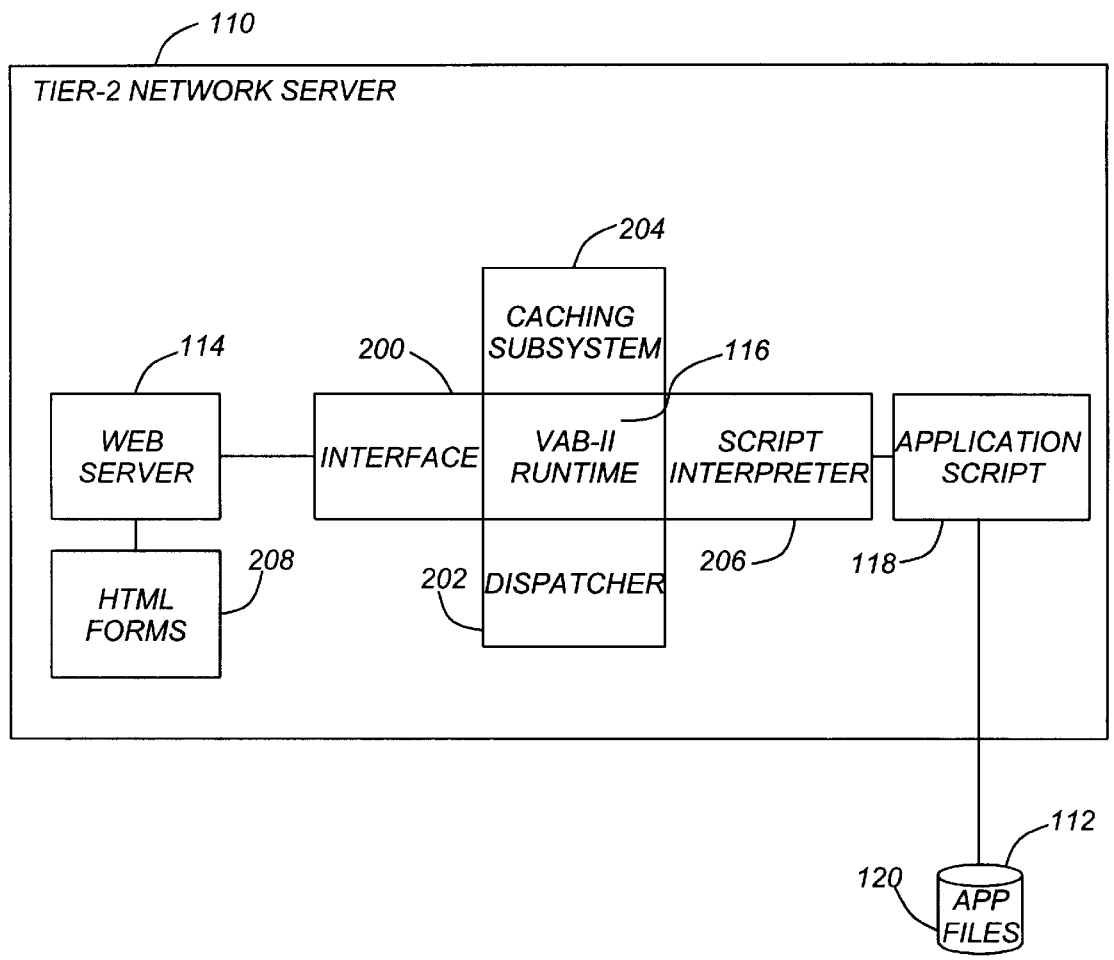
FIG. 2 is a block diagram that further illustrates the components of the network server in the present invention.

FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), Netscape Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112.

Figure 3:
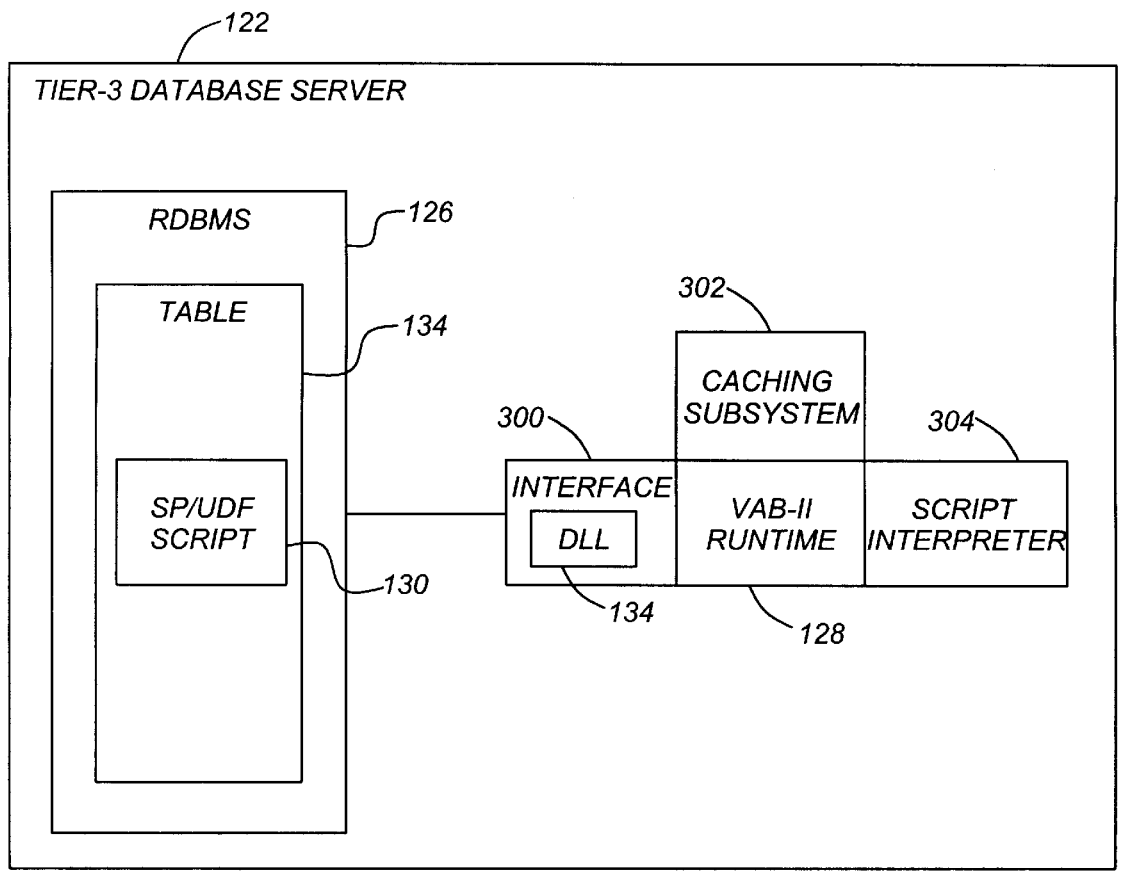
FIG. 3 is a block diagram that further illustrates the components of the database server in the present invention.

FIG. 3 is a block diagram that further illustrates the components of the database server 122 in the present invention. The VAB-II runtime module 128, for example, includes an interface 300 to the RDBMS 126, a caching subsystem 302, and a script interpreter 304 for executing one or more SP/UDF scripts 130 retrieved from a table 134 maintained within the RDBMS 126, independent of the file I/O system. No dispatcher is required for the VAB-II runtime module 128 in the database server 122. The interface 300 provides a mechanism for invoking the RDBMS 126 from the VAB-II runtime module 128 via a dynamic link library (DLL) 138 or some other protocol. As in the network server 110, the caching subsystem 302 exists to help manage special purpose object persistence, although SP/UDF scripts 130 are generally not persistent. The script interpreter 304 executes the p-code or source code for the SP/UDF script 130 retrieved from the table 134. The code in this table is backed up along with the rest of the data stored in the RDBMS 126, and can be accessed by applications running under a wide variety of differing operating systems.

As indicated above, the computer programs of the three tiers shown may be executed on separate computer hardware platforms or on a single computer hardware platform 134 or in some combination thereof. Each of the computers may each include, inter alia, one or more processors, memory, keyboard, or display, and may be connected locally or remotely to fixed and/or removable data storage devices and/or data communications devices. Each of the computers in each of the tiers also could be connected to other computers via the data communications devices.

Development Environment

Figure 4:
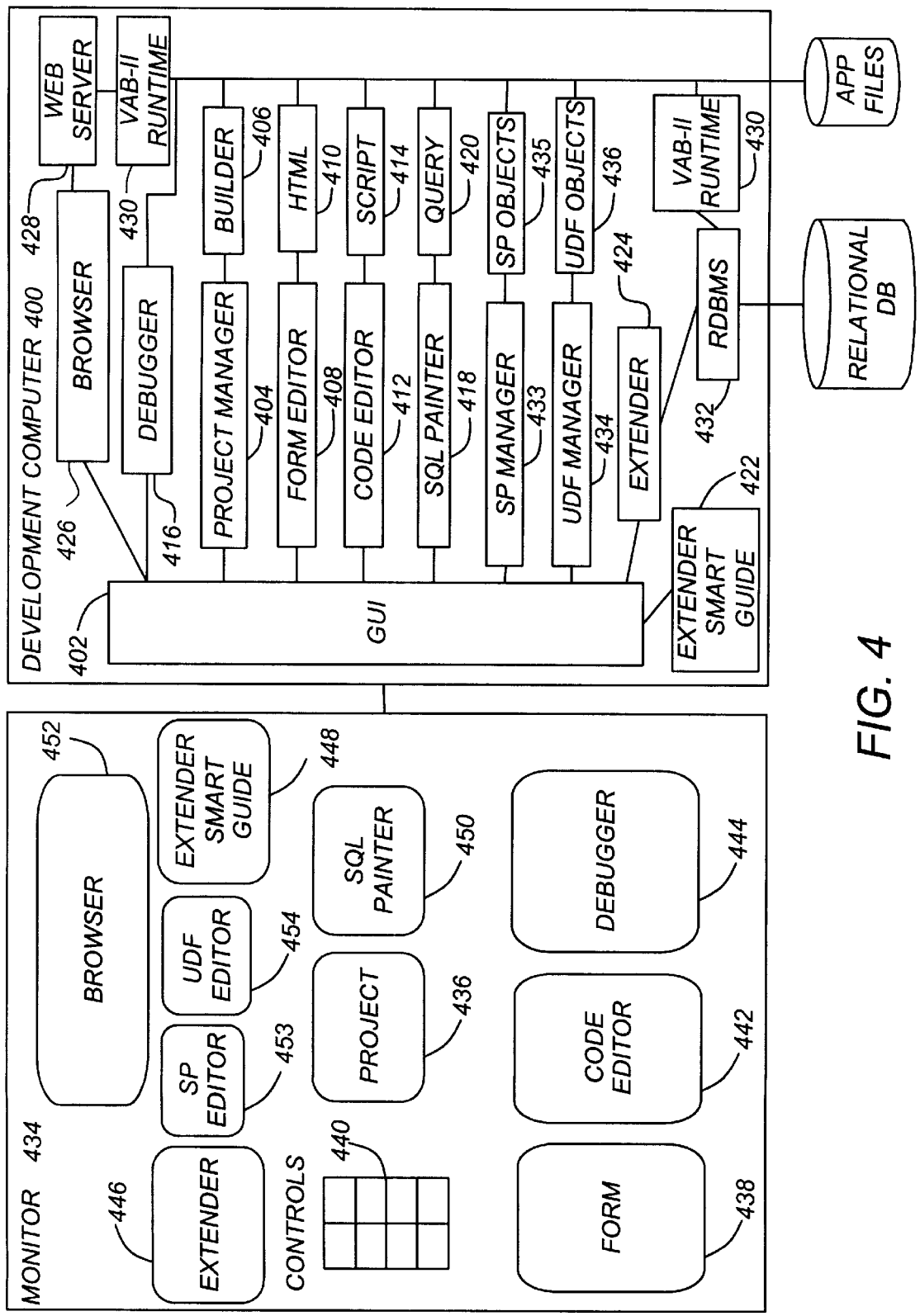
FIG. 4 is a block diagram that illustrates the development environment of the present invention.

FIG. 4 is a block diagram that illustrates the development environment of the present invention. A development computer 400 executes a Rapid Application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, RDBMS module 432, stored procedure manager 433 for constructing stored-procedure objects 435, and user-defined-function manager 434 for constructing user defined function objects 436. The RAD tool displays a user interface on a monitor 434 attached to the development computer 400, which includes, inter alia, a project window 436, form editor window 438, control pad 440, code editor window 442, debugging window 444, extender user interface window 446, extender guide window 448, SQL painter window 450, as well as a browser window 452, a stored procedure editor 453 and a user-defined function editor 454.

As described above, the present invention is typically implemented using a plurality of computer programs, each of which executes under the control of an operating system, such as OS/2, Windows, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Multi-Tier Debugging

Figure 5:
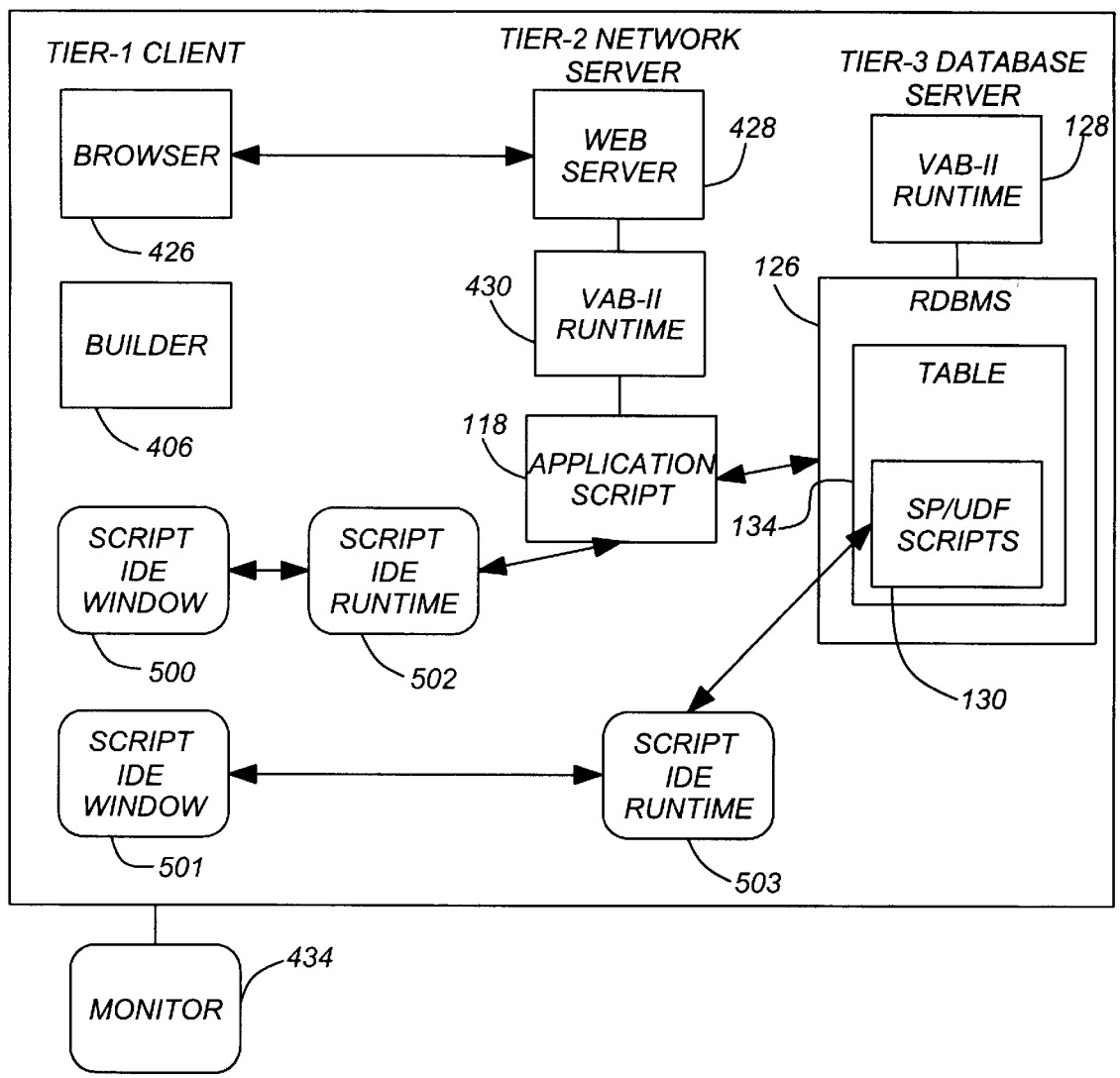
FIG. 5 is a block diagram that illustrates the multi-tier nature of the debugger executed by the development computer according to the present invention.

FIG. 5 is a block diagram that further illustrates the multi-tier nature of the debugger 444 executed by the development computer 400 according to the present invention. The present invention allows the debugging of multiple tiers at the same time, when the tiers are on separate machines or when the tiers are on a single machine. The debugger 444 uses a debug facility from the Lotus Script Integrated Development Environment (IDE), but splits the debug facility into a window or graphical user interface module 500 and a runtime module 502.

As indicated above, the programming logic in the present invention runs in tier-2 (as an application script 118) and tier-3 (as an SP/UDF script 130), and is driven by user interactions with the browser 426 in tier-1. At the same time, a plurality of LotusScript IDEs are executed by the development computer 400, wherein each IDE includes a window module 500 and a runtime module 502. The IDEs support source level debugging on the development computer which allows users to set breakpoints, step through the source code, inspect values, and modify variables.

In the example of FIG. 5, a first window module 500 and first runtime module 502 are executed on the development computer 400 for the tier-2 application script 118, so that breakpoints can be set and variables modified. Similarly, a second window module 501 and second runtime module 503 are executed on the development computer 400 for the tier-3 SP/UDF script 130, so that breakpoints can be set and variables modified. As the user interacts with controls in the HTML page displayed by the browser 426, the application script 118 and SP/UDF script 130 are executed and breakpoints within the scripts are triggered within the first and second window modules 500 and 501 and runtime modules 502 and 503, respectively.

In the present invention, the development computer 400 is intended to mimic a production environments as much as possible. The same components are used and the same logic is driven. This enables the components to be designed and implemented once, rather than implemented multiple times. It also enables the developer to have very high confidence that the testing being done reflects the actual environment in which the application will eventually run when published on multiple tiers.

Debugging prior to production (i.e., prior to when the application has been published to servers) is virtually identical to debugging in production. The same modules and structures are used. This enables developers to test scripts in a development environment that is functionally identical to the production environment.

Dynamic Debugging

Figure 6:
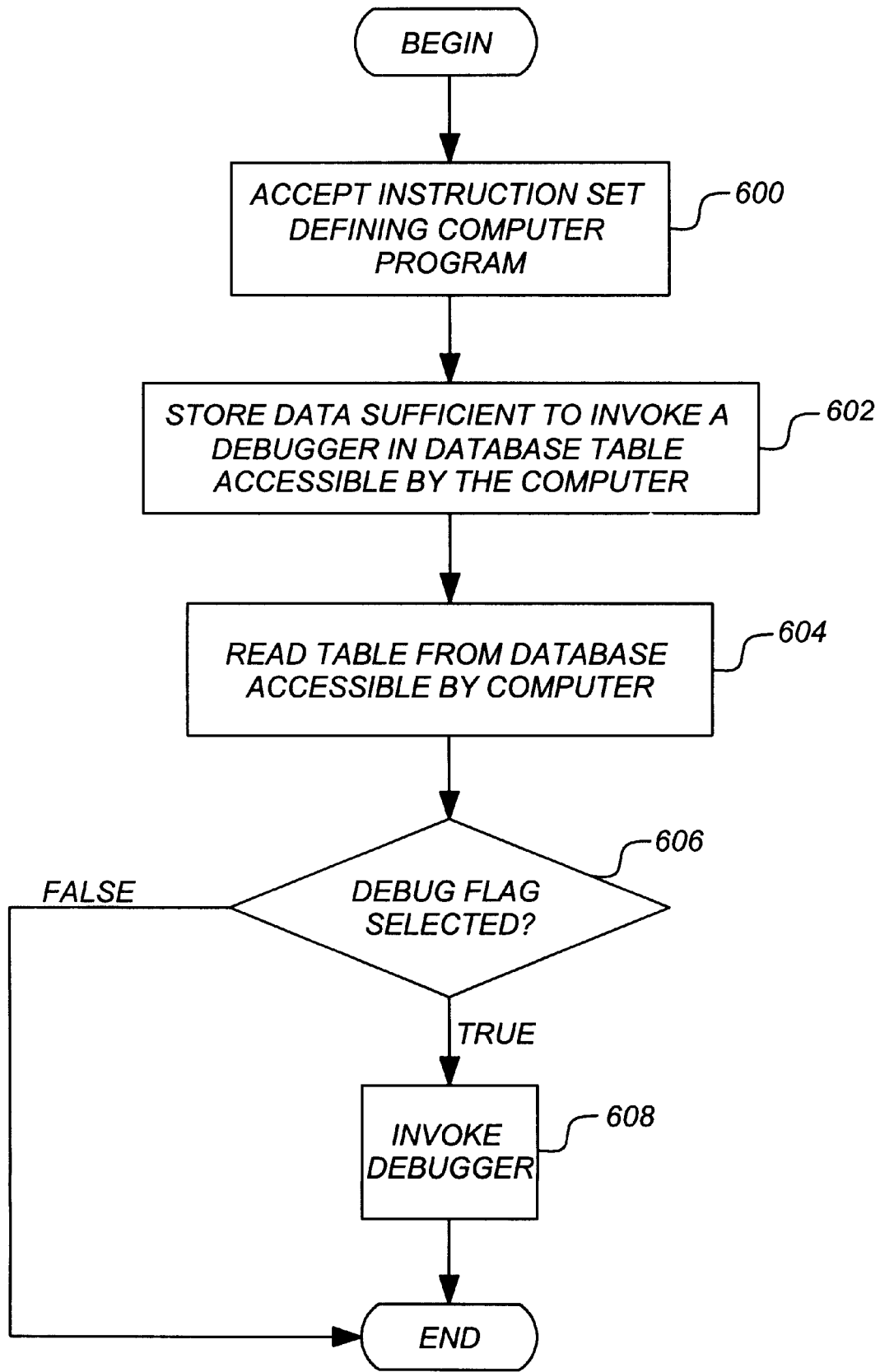
FIG. 6 is a flow chart illustrating an overview of the operations performed in the present invention.

FIG. 6 is a flow chart illustrating the operations performed in the present invention. In summary, the present invention maintains a set of tables in each database selected as a target for building a computer program such as a stored procedure or user-defined function. If these tables do not exist, but are required, the present invention creates these tables. In each table is stored information for each stored procedure or user-defined function that is built using VAB and that is not stored in the DB2 catalog tables or in a pseudo catalog table. This information includes user-defined function or stored procedure argument BASIC data types and intermediate p-code, which are computer interpretable instructions. In one embodiment, this information stored in one of these tables is organized into four columns, one for the key (also known as the specific name), a unique identifier for each stored procedure and user-defined function, one for the debug flag, and two for the internet protocol (IP) address and port number of the debugger, which are used to communicate with the development environment, and another table is organized into three columns, one for the key (specific name), one for a sequence number, and one for a segment of the instruction stream (including the p-code). As illustrated in FIG. 6, the process begins in block 600 by accepting an instruction set defining a computer program or routine in a computer. Next, block 602 stores data sufficient to invoke a debugger in a database table accessible by the computer. When the computer program is executed, the table is read 604 from the database, and if the debug flag is selected 606, the debugger is invoked 608. Alternatively, if the debug flag is not set, the debugger is not invoked.

Figure 7:
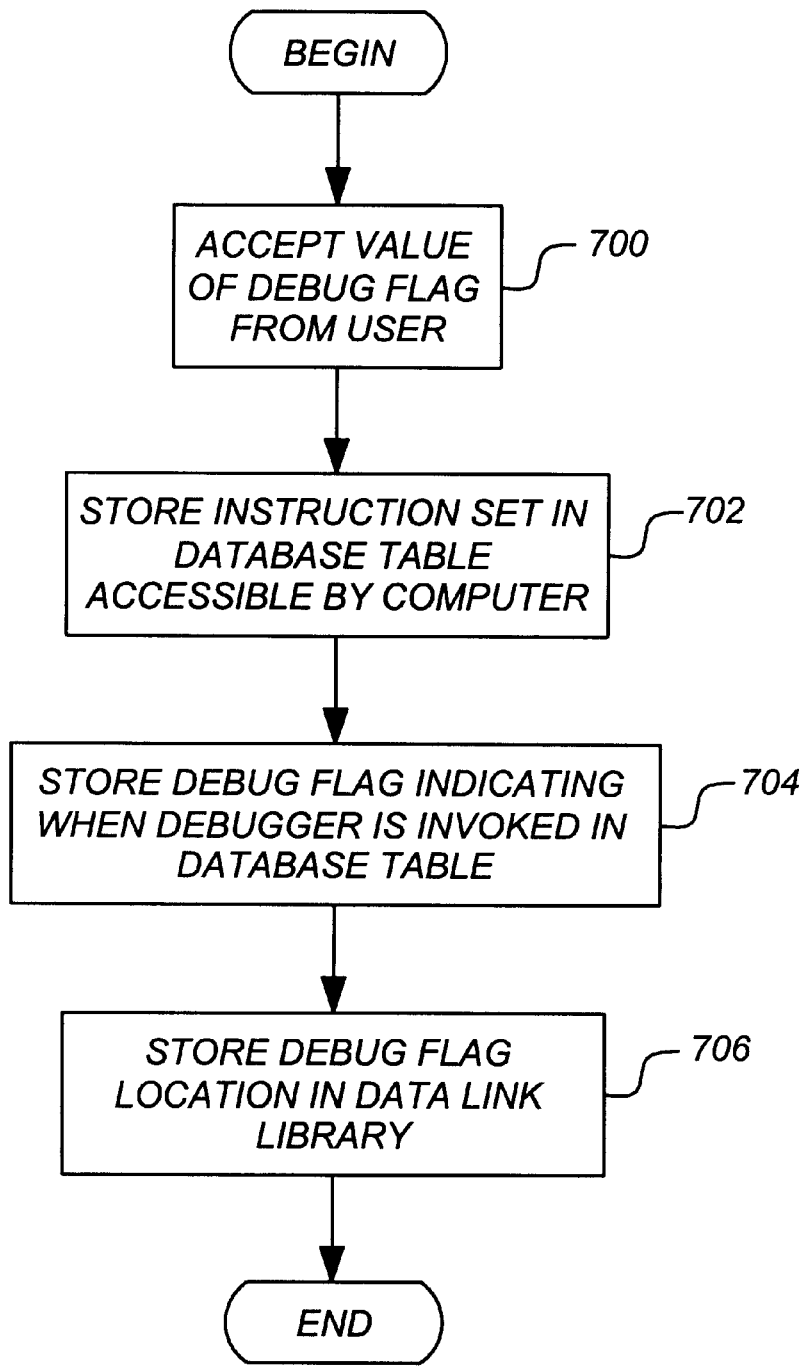
FIG. 7 is a flow chart detailing the operations performed in the present invention to store data that invokes the debugger in the present invention.

FIG. 7 is a flow chart detailing the operations performed in the present invention to store data that invokes the debugger in the present invention. The process begins by accepting 700 the debug flag value or state from the user. Further detail of the operations performed to accept this data is discussed herein with respect to FIGS. 8 and 9. Next, block 702 stores the instruction set in the database table 704. Then, to a key, address, or other value (known as the specific name) is stored in DLL 138 associated with the user-defined function or stored procedure, as shown in block 706. This allows the user-defined function or stored procedure to rapidly find and read the information required to invoke the debugger.

Figure 8:
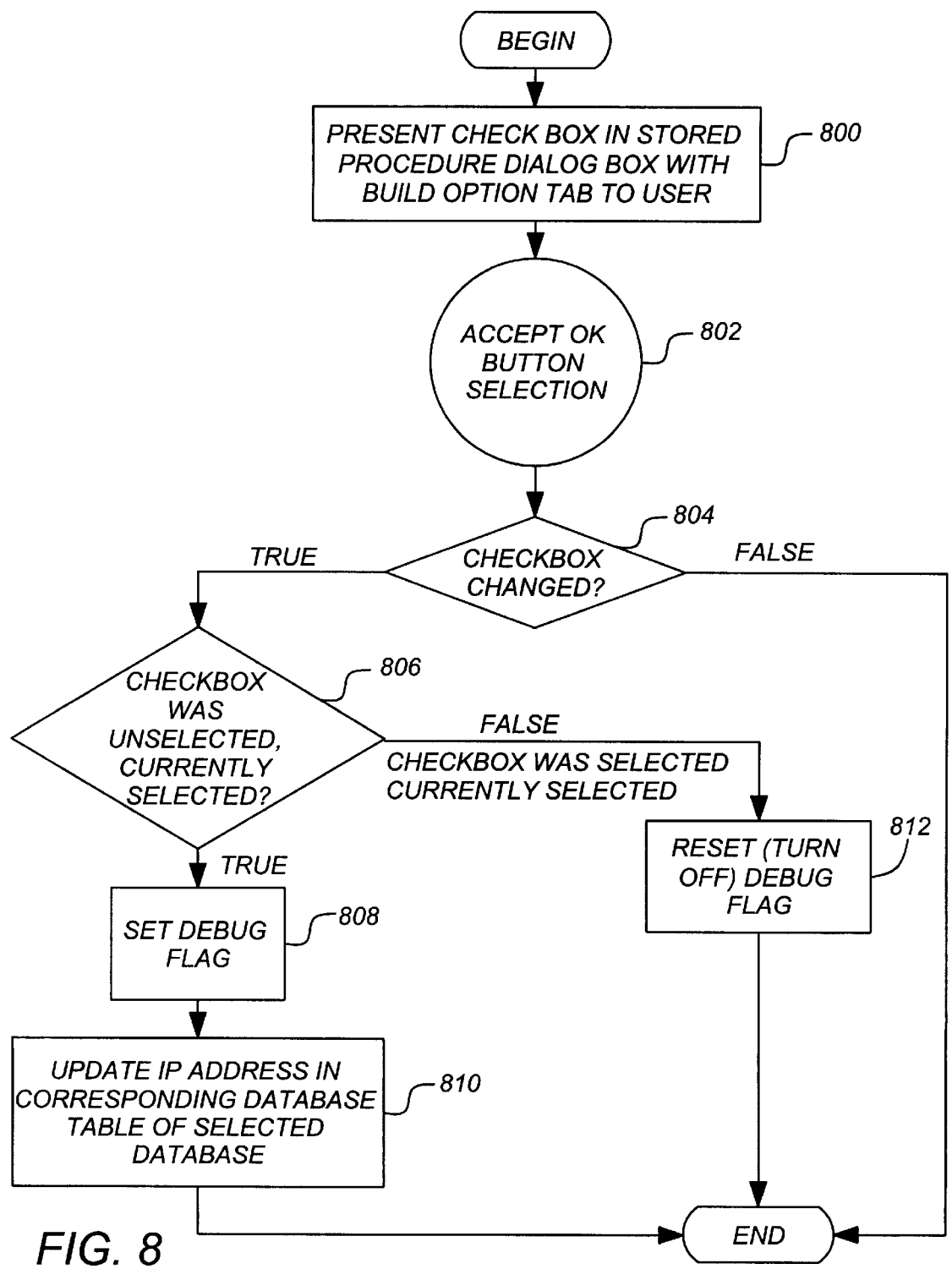
FIG. 8 is a flow chart detailing the operations performed to accept the value of the debug flag.
Figure 9:
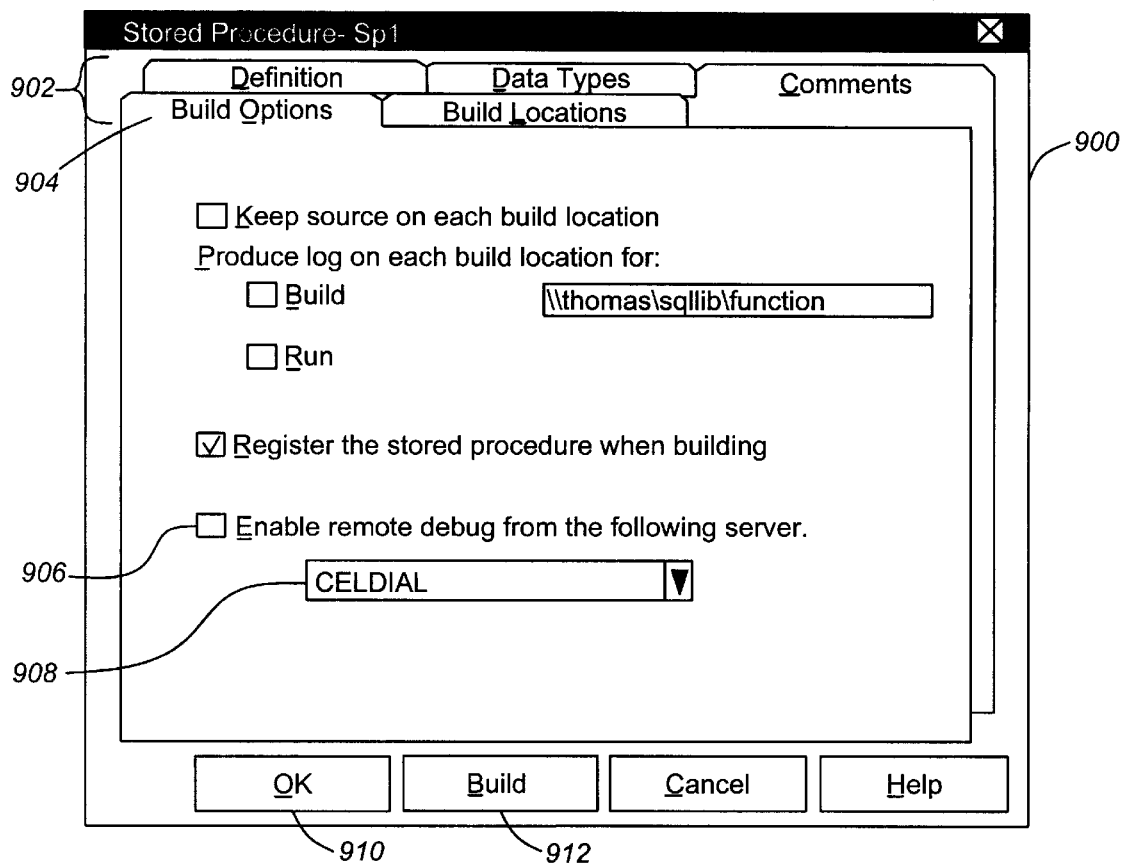
FIG. 9 is a diagram showing one embodiment of a user interface to accept the value of the debug flag in the present invention.

FIGS. 8 and 9 illustrate the operations and user interface used to accept the value of the debug flag in one embodiment of the present invention. In this embodiment, the user is presented 800 with a stored procedure or user-defined function dialog box 900 with one or more tabs 902. One of the tabs 902 is the build options tab 904. If the user selects a debug selecting input delimeter such as checkbox 906, a combo box 908 is activated to list available databases. In one embodiment of the invention, the user is restricted to specify only a single database where the stored procedure or user defined function has been built, and where the debug flag is set. This feature of restricting the user to a single database for debugging a given stored procedure or user-defined function. Typically, the user has access to several databases, which contain different data or which are distributed copies of the same database to improve application performance or lower the risk of development activities. Although the stored procedure and user-defined function builders described herein allow the user to select multiple databases as targets in build operations, it is advantageous to select only one such database for debugging.

Upon selection, the appropriate debug flags are set 804 when the OK button 910 is selected 802. The build options presented are part of the editor for stored procedures or user-defined objects in the VAB project. After the OK button 910 is selected 802, the checkbox is examined to determine if its state has changed. This is depicted in block 804. If the checkbox status has not changed, no further operations are performed. If the checkbox status has changed, the debug flag is turned off if the checkbox was initially selected, but deselected by the user before selecting the OK button 910. If the checkbox was initially unselected, and now selected, the debug flag is set 808, and the internet protocol (IP) address stored in the database table for the selected database is updated 810.

Figure 10:
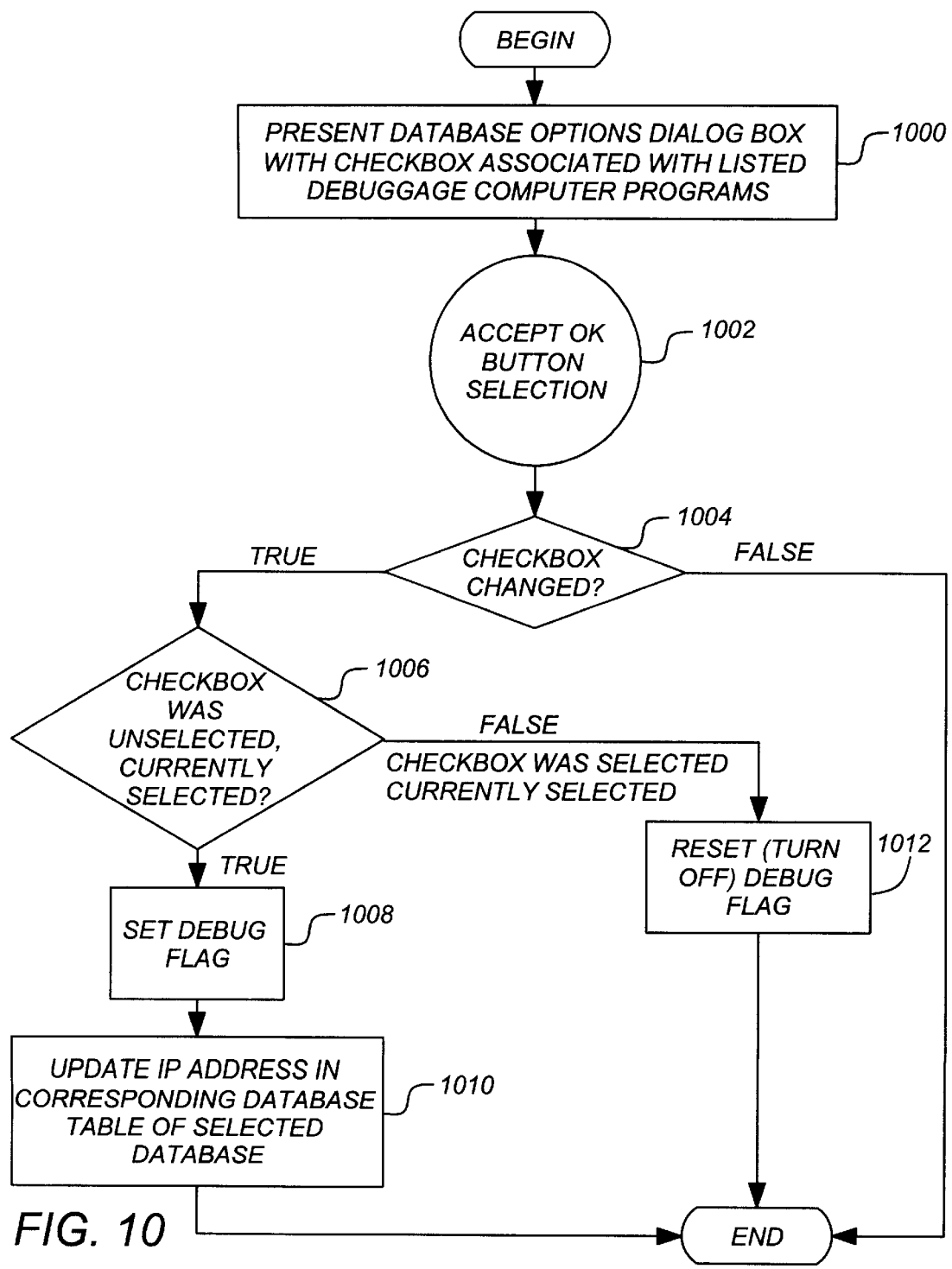
FIG. 10 is a flow chart detailing the operations performed to accept the value of the debug flag in the present invention.
Figure 11:
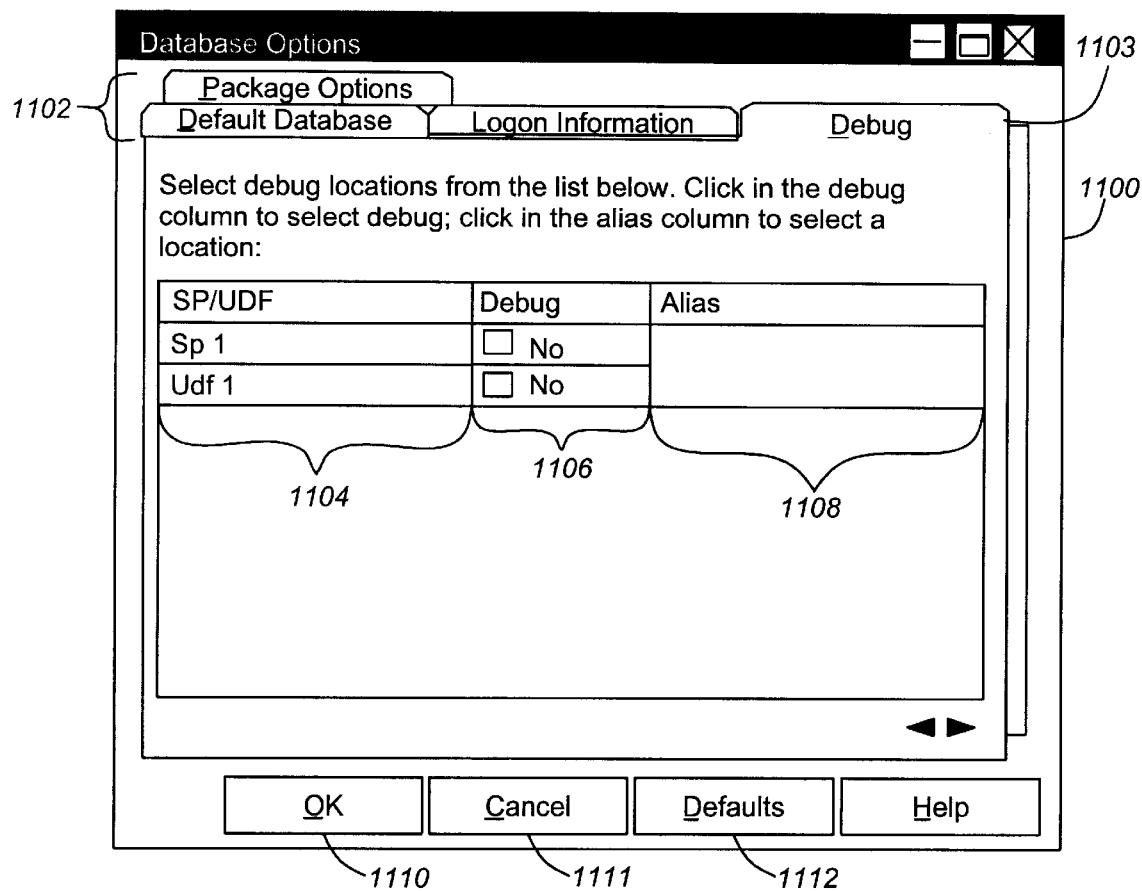
FIG. 11 is a diagram showing one embodiment of a user interface to accept the value of the debug flag in the present invention.

FIGS. 10 and 11 illustrate the operations and user interface used to accept debug flag values in another embodiment of the present invention. In this embodiment, the user is presented 1000 with a database options notebook 1100 comprising one or more tabs 1102, including a debug tab 1103 that lists all stored procedures and user-defined functions 1104 for the applicable project. The list is presented in tabular form, and includes a checkbox 1106 for each stored procedure/user-defined function, and an alias field 1108. If a debug checkbox 1106 is checked, a DB2 database alias cataloged for the development environment is selected using a combo box appearing in the alias field 1108. If the tabbed notebook 1100 is canceled with the cancel button 1111, or if the user input did not change the checkbox state, as shown in block 1004, nothing is changed. However, if the tabbed notebook 1100 is closed with the OK button 1110 after making the foregoing entries, a database options manager sets 1004 or unsets 1006 the debug flag for each changed row. As before, if the checkbox was unselected but is currently selected, the debug flag is set or turned on 1008 and the IP address in the corresponding database table is updated 1010. If the checkbox was selected but is currently unselected, the debug flag is turned off 1012. If a stored procedure or user-defined function is called (by any user) and the debug flag in the corresponding table is on, run-time attempts to communicate with the development environment.

If communication cannot be established (the user closed the VAB development environment or has shut down the computer implementing VAB) or if the user opens a project that does not include the source code for the stored procedure or user-defined function, runtime will turn the debug flag off and run the stored procedure or user-defined function without debugging. The user calling the stored procedure or user-defined function will thus experience a one time degradation of the runtime check.

Alternatively, if communication is established and the opened project has a stored procedure or user-defined function source, the debugger opens on the user's computer and allows the user to step through the source code, to set and run break points, view and set variables, view the call stack, and to perform other debugging operations.

Figure 12:
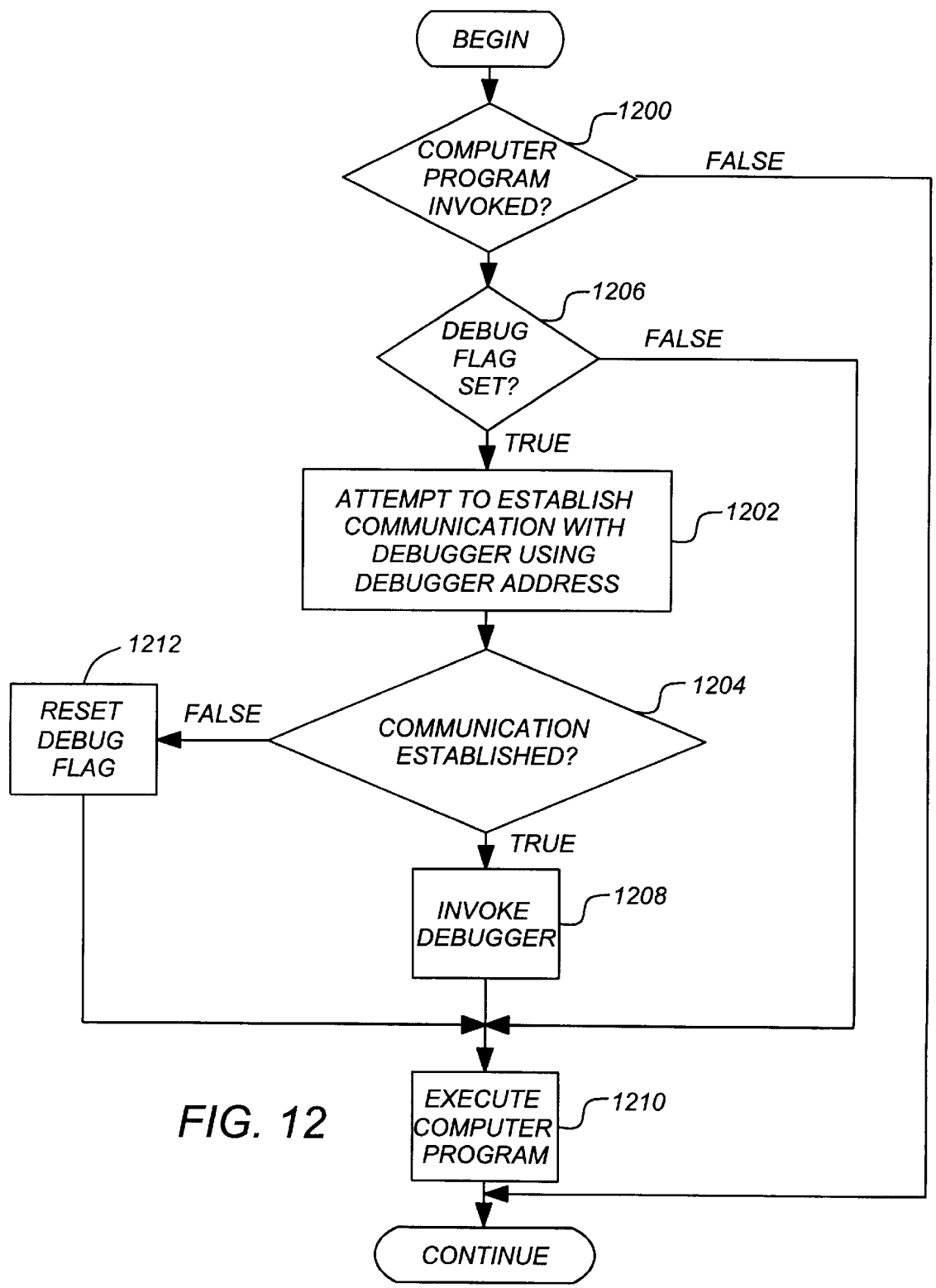
FIG. 12 is a diagram showing the operations performed when a stored procedure or user-defined function is executed.

FIG. 12 presents a flow chart showing the operations performed when a stored procedure or user-defined function is executed. Once a computer program comprising a user-defined function and/or a stored procedure is invoked 1200, if the debug flag is set 1206, the system attempts to establish communication with the debugger using the debugger address. This is illustrated in block 1202. If communication is not established 1204, the debug flag is reset 1212, and the computer program is executed 1210 normally without debugging. If communication is established 1204, the debugger is invoked 1208, and the computer program is executed 1210 with debugging.

Figure 13:
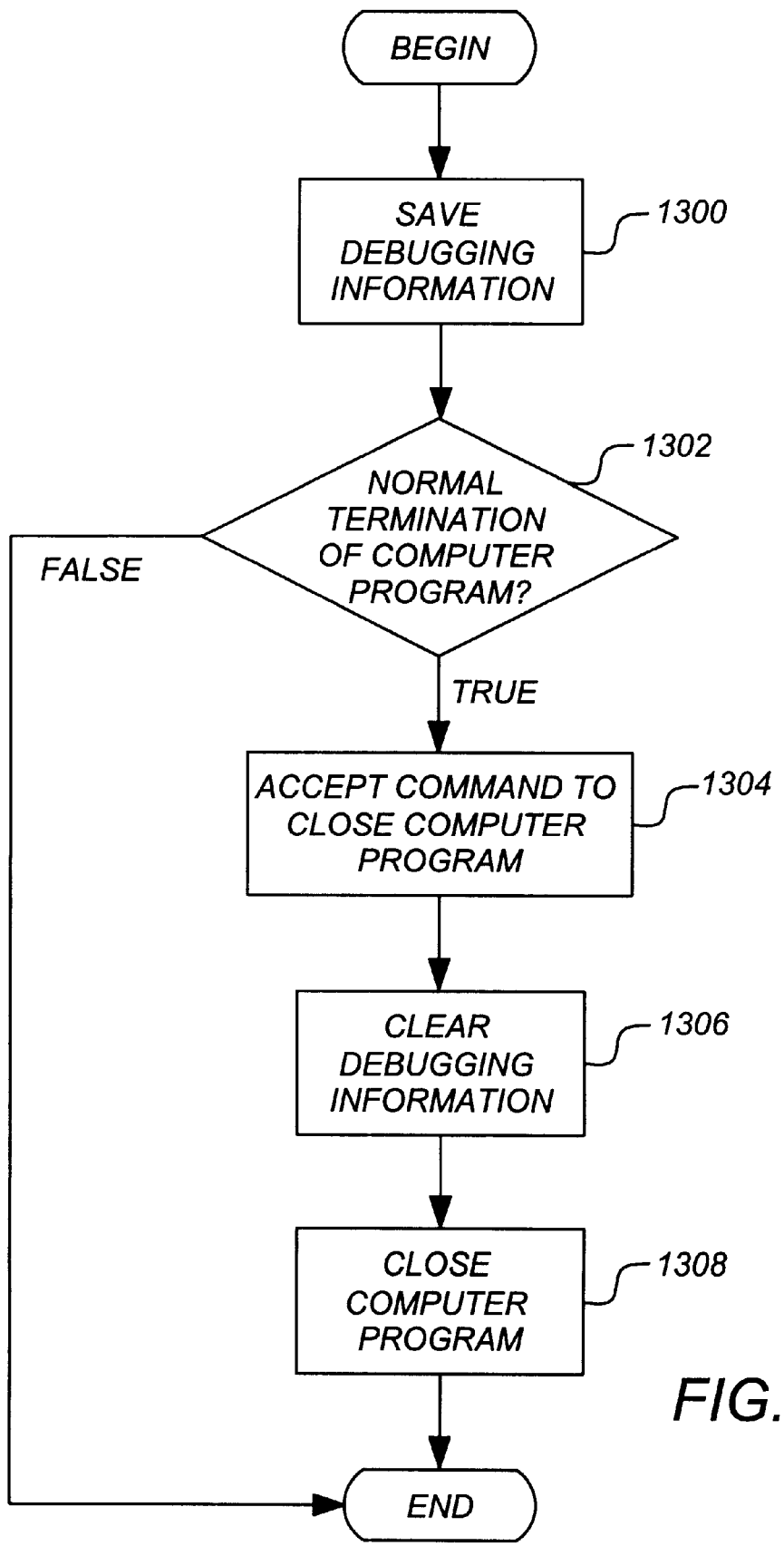
FIG. 13 is a diagram showing the operations performed with respect to setting and resetting the debug flag of the present invention.

FIG. 13 is a flow chart illustrating how and when debug information is stored for later use. First, the computer program stores 1300 information for each stored procedure and user-defined function that has been set for debug. This information is stored 1300 both in the database, and in the user environment. If the computer program terminates normally 1302, the builder (VAB) accepts a command to close the program 1304, the debug flag is cleared from the database and from the environment 1306, since debugging operations are no longer needed, and the computer program is closed 1308. If, however, the computer did not terminate normally before accepting a command to close the computer program or project 1304, debugger information is retrieved from the environment when the computer program is reopened for execution. This information is used to clear debugging information from the database. In a WINDOWS-NT environment for example, this information may be stored with other user preferences in the registry.

Run Local/Run Remote

The development computer 400 also provides a "Run Local/Run Remote" function under the builder 406 that supports the multi-tier debugging facility of the present invention.

"RunLocal" is the function selected to run the application on the local development computer 400 (and prepare for debugging it). The application is essentially "completed" by generating the appropriate HTML and storing it under a directory representing this application where the local web sever 428 can access it for display to the local browser 426. In addition, the application script 118 is "published" to the local machine in a place where the local VAB-II runtime module 430 can execute the script 414, and the builder 406 and debugger 444 can debug the script.

Similarly, "RunRemote" is the function selected to run the application on a remote network server (and prepare for debugging it). The "RunRemote" function executes the browser 426 and points it at the Universal Resource Locator (URL) describing the first page of an application which has already been published on some network server (if the application was not published using the project window, the user must type this URL into the browser). Any special debugging parameters are inserted into the URL automatically. The major differences between RunRemote and simply running the application by typing in the URL in the browser 426 are: (1) the project window 436 is displayed and (2) debug information is automatically inserted in the URL. These are preparations for debugging the application remotely. A window module 500 will be displayed so that breakpoints, etc., can be specified and triggered as soon as the tier-2 script 118 is invoked. Likewise, a window module 500 will be displayed so that breakpoints, etc., can be specified and triggered as the tier-3 script 130 is invoked. Both of these "automatic debugger windows" are optional.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or stand-alone personal computer, could be used with the present invention.

The foregoing invention is particularly well suited for use with languages which are interpreted, rather than compiled, but can effectively implemented with a broad variety of languages. For example, although some of the benefits of the foregoing invention are reduced when using compiled languages (including the extra storage and processing requirements to operate with the debugging information compiled into the executable), the present invention is operable with these compiled languages as well. In summary, the present invention discloses a method, apparatus, and article of manufacture for providing a programming development environment that supports the development of Internet and Intranet applications. More specifically, the present invention discloses a method, apparatus, and memory for dynamically debugging a computer program or routine. The method comprises the steps of accepting an interpretable instruction set defining the computer routine in the computer, storing the instruction set and a debug flag in a database table accessible by the computer, storing a key to the debug flag and the instruction set in a DLL associated with the computer routine, reading the instruction set and the debug flag from the database table using the key, and reading the instruction set from the database table into the computer and invoking the debugger when the debug flag indicates that the computer routine should be run in the debug mode.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of debugging a computer routine, comprising the steps of:
   accepting an interpretable instruction set defining the computer routine in the computer;
   storing the instruction set and a debug flag in a database table accessible by the computer;
   storing a key to the debug flag and the instruction set in a data link library (DLL) associated with the computer routine;
   reading the instruction set and the debug flag from the database table using the key; and
   reading the instruction set from the database table into the computer and invoking the debugger when the debug flag indicates that the computer routine should be run in the debug mode.

2. A method of debugging a computer program, comprising the steps of:
   accepting an instruction set defining the computer program in the computer; and
   storing data sufficient to invoke a debugger in a database table accessible by the computer;
   wherein the step of storing data sufficient to define and invoke a debugger in a database table comprises the steps of:
      storing the instruction set in a database table accessible by the computer; and
      storing a debug flag in the database table, the debug flag indicating when the debugger is invoked;
      wherein the step of storing a debug flag in the database table comprises the steps of:
         presenting a debug selecting input delimiter to a user;
         presenting a list of available database tables to the user when the debug selecting input delimeter is selected;
         accepting a database table selection comprising a single database table;
         setting the debug flag and storing an address of the debugger in the selected database table; and
         resetting the debug flag when the debug selecting input delimeter is not selected.

3. A method of debugging a computer program, comprising the steps of:
   accepting an instruction set defining the computer program in the computer; and
   storing data sufficient to invoke a debugger in a database table accessible by the computer;
   wherein the step of storing data sufficient to define and invoke a debugger in a database table comprises the steps of:
      storing the instruction set in a database table accessible by the computer; and
      storing a debug flag in the database table, the debug flag indicating when the debugger is invoked;
      wherein the instruction set comprises computer program instructions and debugger instructions.

4. A method of debugging a computer program, comprising the steps of:
   accepting an instruction set defining the computer program in the computer; and
   storing data sufficient to invoke a debugger in a database table accessible by the computer by performing the steps of storing the instruction set in a database table accessible by the computer and storing a debug flag in the database table, the debug flag indicating when the debugger is invoked; and storing a debugger address in the database table.

5. A method of debugging a computer program, comprising the steps of:

accepting an instruction set defining the computer program in the computer; and storing data sufficient to invoke a debugger in a database table accessible by the computer by performing the steps of storing the instruction set in a database table accessible by the computer and storing a debug flag in the database table, the debug flag indicating when the debugger is invoked; and accepting the value of the debug flag from a user, the accepting step comprising the steps of:

presenting a stored procedure dialog box having a build option tab to the user, the build option tab including a check box for selecting the debug flag; and setting the debug flag when the check box is selected by the user.

6. A method of debugging a computer program, comprising the steps of:

accepting an instruction set defining the computer program in the computer; and storing data sufficient to invoke a debugger in a database table accessible by the computer by performing the steps of storing the instruction set in a database table accessible by the computer and storing a debug flag in the database table, the debug flag indicating when the debugger is invoked; and accepting a debug flag entry from a user, the accepting step comprising the steps of:

presenting a database options dialog box to the user, the database options dialog box having a list of debuggable computer programs, a checkbox associated with each debuggable computer program; and setting the debug flag for the computer program when the associated check box is selected by the user.

7. A method of debugging a computer program comprising an instruction set having computer program instructions and debugger instructions, comprising the steps of:

reading a table from a database accessible by the computer, the table comprising the instruction set and a debug flag; and invoking a debugger when the debug flag indicates that the computer program should be run in a debug mode.

8. The method of claim 7, further comprising the step of reading a dynamic link library (DLL) to determine the location of the instruction set and the debug flag.

9. The method of claim 7, wherein the invoking step comprises the steps of: attempting to establish communication with the debugger using a debugger address when the computer program is invoked and the debug flag is set;

activating the debugger when communication is established;

resetting debug flag when communication with the debugger is not established; and executing the computer program.

10. The method of claim 9, further comprising the steps of:

saving debugger information in the database and a user environment;

accepting a command to close the computer program; and clearing the debug information in the database and the user environment when the computer program terminates normally.

11. The method of claim 10, further comprising the steps of:

querying the debugger information from the user environment when the computer program is opened;

resetting the debug flag using the debugger information;

clearing the debugging information from the user environment.

12. An apparatus for debugging a computer program, comprising:

a computer, having a memory and a processor;

means, performed by the computer, for accepting an instruction set defining the computer program in the computer; and means, performed by the computer, for storing data sufficient to invoke a debugger in a database accessible by the computer, including means, performed by the computer, for storing the instruction set in a database accessible by the computer, and means, performed by the computer, for storing a debug flag in the database, the debug flag indicating when the debugger is invoked;

wherein the means for storing a debug flag in the database comprises:

means, performed by the computer, for presenting an input delimeter to a user;

means, performed by the computer, for presenting a list of available database tables to the user when the debug selecting input delimeter is selected;

means, performed by the computer, for accepting a database table selection comprising a single database table; and means, performed by the computer, for setting the debug flag when the debug selecting input delimeter is not selected.

13. An apparatus for debugging a computer program, comprising:

a computer, having a memory and a processor;

means, performed by the computer, for accepting an instruction set defining the computer program in the computer; and means, performed by the computer, for storing data sufficient to invoke a debugger in a database accessible by the computer, including means, performed by the computer, for storing the instruction set in a database accessible by the computer, and means, performed by the computer, for storing a debug flag in the database, the debug flag indicating when the debugger is invoked;

wherein the instruction set comprises computer program instructions and debugger instructions.

14. An apparatus for debugging a computer program, comprising:

a computer, having a memory and a processor;

means, performed by the computer, for accepting an instruction set defining the computer program in the computer;

means, performed by the computer, for storing data sufficient to invoke a debugger in a database accessible by the computer, including means, performed by the computer, for storing the instruction set in a database accessible by the computer, and means, performed by the computer, for storing a debug flag in the database, the debug flag indicating when the debugger is invoked; and means, performed by the computer, for storing a debugger address in the database.

15. An apparatus for debugging a computer program, comprising:

a computer, having a memory and a processor;

means, performed by the computer, for accepting an instruction set defining the computer program in the computer;

means, performed by the computer, for storing data sufficient to invoke a debugger in a database accessible by the computer, including means, performed by the computer, for storing the instruction set in a database accessible by the computer, and means, performed by the computer, for storing a debug flag in the database, the debug flag indicating when the debugger is invoked; and means, performed by the computer, for accepting the value of the debug flag from a user, the accepting means having means for presenting a stored procedure dialog box having a build options tab to the user, the build options tab having a checkbox selecting the debug flag, and means for setting the debug flag when the checkbox is selected by the user.

16. An apparatus for debugging a computer program, comprising:

a computer, having a memory and a processor;

means, performed by the computer, for accepting an instruction set defining the computer program in the computer;

means, performed by the computer, for storing data sufficient to invoke a debugger in a database accessible by the computer, including means, performed by the computer, for storing the instruction set in a database accessible by the computer, and means, performed by the computer, for storing a debug flag in the database, the debug flag indicating when the debugger is invoked; and means, performed by the computer, for accepting a debug flag entry from a user, the accepting means having means for presenting a database options dialog box having a list of debuggable computer programs and a checkbox associated with each debuggable computer program to the user, and means for setting the debug flag for the computer program when the associated check box is selected by the user.

17. An apparatus for debugging a computer program comprising an instruction set having computer program instructions and debugger instructions, comprising:

a computer, having a memory and a processor;

means, performed by the computer, for reading a value from a database accessible by the computer, the value comprising the instruction set and a debug flag; and means, performed by the computer, for invoking a debugger when the debug flag indicates that the computer program should be executed in the debug mode.

18. The apparatus of claim 17, further comprising means, performed by the computer, for reading a dynamic link library (DLL) to determine the location of the instruction set and the debug flag.

19. The apparatus of claim 17, wherein the invoking means comprises:

means, performed by the computer, for attempting to establish communication with the debugger using a debugger address when the computer program is invoked and the debug flag is set;

means, performed by the computer, for activating the debugger when communication is established;

means, performed by the computer, for resetting the debug flag when communication with the debugger is not established; and means, performed by the computer, for executing the computer program.

20. The apparatus of claim 19, further comprising:

means, performed by the computer, for saving debugger information in the database and a user environment, means, performed by the computer, for accepting a command to close the computer program; and means, performed by the computer, for clearing the debug information in the database and the user environment when the computer program terminates normally.

21. The apparatus of claim 20, further comprising:

means, performed by the computer, for querying the debugger information from the user environment when the computer program is opened;

means, performed by the computer, for resetting the debug flag using the debugger information; and means, performed by the computer, for clearing the debugging information from the user environment.

22. A program storage device, readable by a computer having a memory and a processor, tangibly embodying one or more programs of instructions executable by the computer to perform method steps of debugging a computer program, the method comprising the steps of:

accepting an instruction set defining the computer program in the computer;

storing data sufficient to invoke a debugger in a database table accessible by the computer.

storing the instruction set in a database table accessible by the computer; and storing a debug flag in the database table, the debug flag indicating when the debugger is invoked;

wherein the method step of storing a debug flag in the database table comprises the steps of:

presenting a debug selecting input delimiter to a user;

presenting a list of available database tables to the user when the debug selecting input delimeter is selected;

accepting a database table selection comprising a single database table;

setting the debug flag and storing an address of the debugger in the selected database table; and resetting the debug flag when the debug selecting input delimeter is not selected.

23. A program storage device, readable by a computer having a memory and a processor, tangibly embodying one or more programs of instructions executable by the computer to perform method steps of debugging a computer program, the method comprising the steps of:

accepting an instruction set defining the computer program in the computer;

storing data sufficient to invoke a debugger in a database table accessible by the computer.

storing the instruction set in a database table accessible by the computer; and storing a debug flag in the database table, the debug flag indicating when the debugger is invoked;

wherein the instruction set comprises computer program instructions and debugger instructions.

24. A program storage device, readable by a computer having a memory and a processor, tangibly embodying one or more programs of instructions executable by the computer to perform method steps of debugging a computer program, the method comprising the steps of:

accepting an instruction set defining the computer program in the computer;

storing data sufficient to invoke a debugger in a database table accessible by the computer.

storing the instruction set in a database table accessible by the computer;

storing a debug flag in the database table, the debug flag indicating when the debugger is invoked; and storing a debugger address in the database table.

25. A program storage device, readable by a computer having a memory and a processor, tangibly embodying one or more programs of instructions executable by the computer to perform method steps of debugging a computer program, the method comprising the steps of:

accepting an instruction set defining the computer program in the computer;

storing data sufficient to invoke a debugger in a database table accessible by the computer.

storing the instruction set in a database table accessible by the computer;

storing a debug flag in the database table, the debug flag indicating when the debugger is invoked; and accepting the value of the debug flag from a user, the accepting step comprising the steps of:

presenting a stored procedure dialog box having a build option tab to the user, the build option tab including a check box selecting the debug flag; and setting the debug flag when the check box is selected by the user.

26. A program storage device, readable by a computer having a memory and a processor, tangibly embodying one or more programs of instructions executable by the computer to perform method steps of debugging a computer program, the method comprising the steps of:

accepting an instruction set defining the computer program in the computer;

storing data sufficient to invoke a debugger in a database table accessible by the computer;

storing the instruction set in a database table accessible by the computer; and storing a debug flag in the database table, the debug flag indicating when the debugger is invoked;

accepting a debug flag entry from a user, the accepting step comprising the steps of:

presenting a database options dialog box to the user, the database options dialog box having a list of debuggable computer programs, a checkbox associated with each debuggable computer program; and setting the debug flag for the computer program when the associated check box is selected by the user.

27. The program storage device of claim 26, wherein the dialog box further comprises an alias field associated with each debuggable computer program, for selecting an alias for the database table.

28. A program storage device, readable by a computer having a memory and a processor, tangibly embodying one or more programs of instructions executable by the computer to perform method steps of debugging a computer program comprising an instruction set having computer program instructions and debugger instructions, the method comprising the steps of:

reading a table from a database accessible by the computer, the table comprising the instruction set and a debug flag; and invoking a debugger when the debug flag indicates that the computer program should be run in a debug mode.

29. The program storage device of claim 28, wherein the method steps further comprises the step of reading a dynamic link library (DLL) to determine the location of the instruction set and the debug flag.

30. The program storage device of claim 28, wherein the invoking step comprises the steps of:

attempting to establish communication with the debugger using a debugger address when the computer program is invoked and the debug flag is set;

activating the debugger when communication is established;

resetting debug flag when communication with the debugger is not established; and executing the computer program.

31. The program storage device of claim 30, wherein the method steps further comprise the steps of:

saving debugger information in the database and a user environment;

accepting a command to close the computer program; and clearing the debug information in the database and the user environment when the computer program terminates normally.

32. The program storage device of claim 31, wherein the method steps further comprise the steps of:

querying the debugger information from the user environment when the computer program is opened;

resetting the debug flag using the debugger information; and clearing the debugging information from the user environment.

33. A memory for storing data for debugging a computer routine, the memory comprising:

a database table readable by a relational database management system accessible by the computer routine, the database table having an interpretable instruction set and a debug flag for invoking a debugger to debug the interpretable instruction set, wherein the interpretable instruction set is retrievable using a key stored in a data link library (DLL) associated with the computer routine.

* * * * *